United States Patent [19]

Kent

[11] 4,456,139

[45] Jun. 26, 1984

[54] VISIBLE TAMPER-PROOF CLOSURE ARRANGEMENT

[75] Inventor: Henry R. Kent, San Diego, Calif.

[73] Assignee: Maxwell Laboratories, Inc., San Diego, Calif.

[21] Appl. No.: 438,605

[22] Filed: Nov. 2, 1982

[51] Int. Cl.³ .................................... B65D 41/34
[52] U.S. Cl. .............................. 215/252; 215/230; 215/250; 206/459
[58] Field of Search ............... 215/203, 220, 230, 246, 215/250, 351, 365, DIG. 2, 252; 206/459, 534; 53/410, 419, 485, 488

[56] References Cited

U.S. PATENT DOCUMENTS

| | | | |
|---|---|---|---|
| 2,068,389 | 1/1937 | Smith | 215/350 |
| 2,390,561 | 12/1945 | Staples | 215/343 |
| 2,706,464 | 4/1955 | North | 215/459 |
| 3,088,830 | 5/1963 | Graham | 215/365 |
| 3,489,307 | 1/1970 | Wenger | 215/351 |
| 3,640,417 | 2/1972 | Sakurai | 215/246 |
| 3,873,018 | 3/1975 | Donnay | 215/246 |
| 3,977,554 | 8/1976 | Costa | 215/220 |
| 4,069,935 | 1/1978 | Hampel | 215/220 |
| 4,394,917 | 7/1983 | Looser | 53/419 |

Primary Examiner—Joseph Man-Fu Moy
Assistant Examiner—David Fidei
Attorney, Agent, or Firm—Fitch, Even, Tabin & Flannery

[57] ABSTRACT

A tamper-proof closure arrangement for a container includes in one embodiment a seal applied to seal receiving surfaces of the container and closure cap such that the seal is applied internally of the closure cap without removing the closure cap and is irreversibly damaged by any attempt to remove the closure cap, the seal being visible through the closure cap to provide a visual indication of tampering. In an alternative embodiment, the seal is fixed internally of a disposable cap which is mounted on an associated container to overlie a reusable closure cap. The seal is visually observable through the disposable cap and is formed in contacting relation against a three-dimensional surface on the reusable cap such that any attempt at removing the disposable cap irreversibly damages or deforms the seal to provide a visual indication of tampering.

22 Claims, 9 Drawing Figures

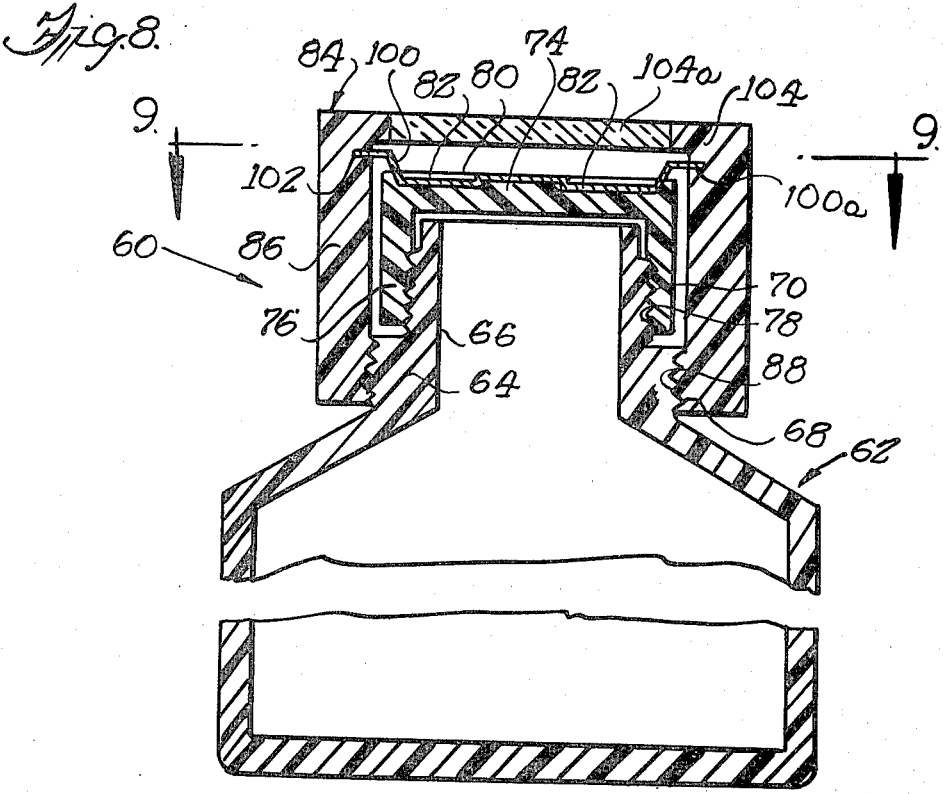
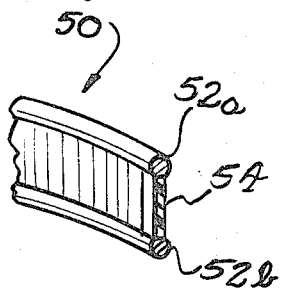
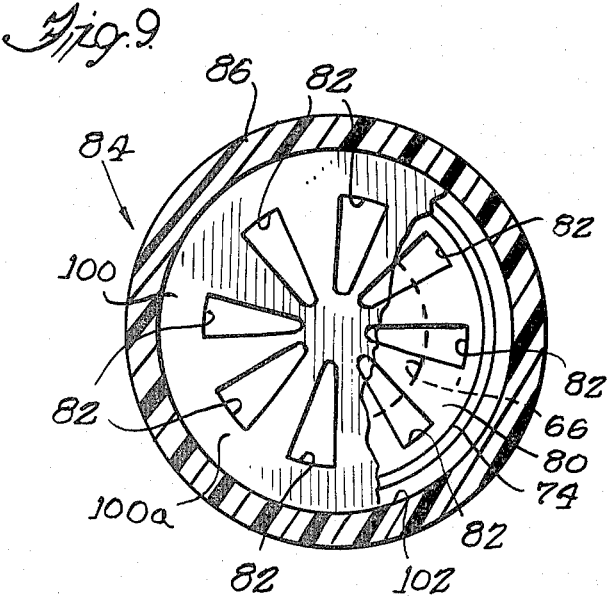
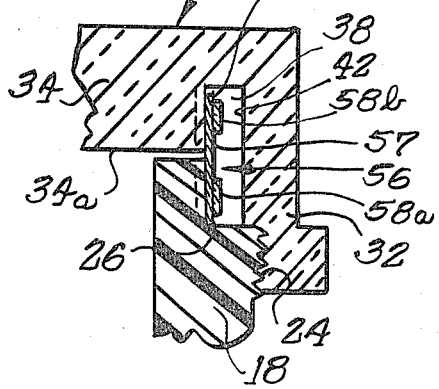

VISIBLE TAMPER-PROOF CLOSURE ARRANGEMENT

BACKGROUND OF THE INVENTION

The present invention relates generally to tamper-proof closures, and more particularly to a novel visible tamper-proof closure arrangement wherein a seal is applied to surfaces internally of an already closed container in a manner such that any tampering with the closure cap causes irreparable damage to the seal which is visually observable through the closure cap.

The emphasis on public safety in recent years, and particularly as it relates to commercial products which are ingested by human beings, has led to the development of various types of containers and closure caps which are termed "tamper-proof". Tamper-proof containers and closures include both containers which have membrane or thin foil-like seals secured as by an adhesive about the periphery of the container neck so as to cover the access opening, and closure caps which are constructed to prevent removal of the closures from associated containers without causing some visual indication that the closure has been removed or otherwise tampered with. This is of particular concern with containers used for ingestible commercially available products so that the purchaser can feel reasonably safe that the purchased goods are unadulterated. The development of tamper-proof containers and closures has resulted from both voluntary private innovation and as a result of legislation passed to insure minimum standards of safety.

A significant drawback of tamper-proof seals of the type wherein a membrane or foil-like seal is placed on the neck of the container so as to overlie the access opening is that while the seal is generally broken by the purchaser to provide access to the contents of the container, it does not take a high degree of skill to at least partially remove the seal for access to the container followed by reattachment of the seal in a manner undetectable by the average consumer. The ability of such a seal to provide a substantially foolproof indication to the consumer that the contents of the container have not been tampered with are thus quite minimal.

One type of closure arrangement which has become quite prevalent in the packaging of consumer products and particularly in the packaging of dairy products such as milk, utilizes a closure cap having a breakaway tamper-proof ring attached therewith through one or more frangible connector elements such that removal of the primary cap generally causes it to be severed from the ring or otherwise fractures the ring so as to provide a visual indication that the primary closure cap has been removed. While this type of tamper-proof closure cap has proven generally successful for its intended purpose, it does not absolutely prevent removal and reapplication by a skilled technician without severing the frangible connections between the closure cap and the tamper-proof ring. Moreover, one having access to the proper equipment can readily remove such a tamper-proof closure even though destroying it in the process, and reapply a closure in similar fashion to the original manufacturer or processor. A significant need thus exists for a tamper-proof closure arrangement wherein the primary closure cap cannot be manipulated or removed in any manner without irreparably damaging a visually observable seal and wherein the seal is applied in a manner which prevents reapplication of a seal by one without a high degree of skill and specialized equipment.

SUMMARY OF THE INVENTION

In accordance with the present invention a novel visible tamper-proof closure arrangement is provided wherein a seal is applied to selected surfaces of a closure cap and container after the closure cap has been applied to the container such that any movement of the closure cap relative to the container causes irreparable damage to the seal visible through the closure cap. The closure cap and neck portion of the container are mutually cooperable to enable placement of an electrically conductive ring-like seal member onto the container neck so that the seal is disposed internally of a skirt on the cap in juxtaposed relation to surfaces on both the neck of the container and the closure cap. The conductive seal is then formed tightly against the underlying cap and container surfaces in intimate contacting relation therewith without removing the closure cap, such as by magnetic forming techniques and the like. In one embodiment, the surfaces on the closure cap and container against which the ring-like seal member is formed comprise three-dimensional surfaces. With the seal so formed against the closure cap and container, any movement of the closure cap relative to the container irreparably damages or deforms the seal. The closure cap is made transparent in at least a portion thereof adjacent the seal to enable visual observation of the seal and thus visual detection of the damaged or deformed seal to ascertain tampering.

In an alternative embodiment, a reusable closure cap is first applied onto the neck portion of a container and has a regular or an irregular three-dimensional configuration on the outer top surface of the cap. A disposable cap is then placed over the reusable cap and secured to the closure. The disposable cap has a generally flat electrically conductive seal member affixed therein so as to lie in juxtaposed relation to the three-dimensional surface on the reusable cap after the disposable cap is secured onto the container. The conductive seal is formed against the three-dimensional surface on the reusable cap such that any movement between the disposable cap and the container irreparably damages or deforms the seal member which is visible through a transparent surface of the throwaway cap so as to provide a visually observable indication of tampering. In all embodiments, the seal is formed against a selected seal receiving surface or surfaces from externally of the outer closure cap without physically engaging the seal so that reforming of the seal or application of a similar seal after opening the container is highly difficult without equipment and/or techniques unavailable to the general public.

Accordingly, one of the primary objects of the present invention is to provide a novel tamper-proof closure arrangement for a container wherein any movement or tampering of the closure cap causes irreparable damage and deforming of a seal which may be readily visually observed through the closure cap.

A more particular object of the present invention is to provide a novel tamper-proof closure arrangement for a container and method for effecting same wherein a conductive seal is formed against selective surfaces on both the container and closure cap while the seal is disposed within the closed closure cap and without removing the closure cap, the seal being formed against underlying seal receiving surfaces such that movement of the closure cap relative to the container causes irreparable deforming of the seal which is visible through the closure cap.

A feature of one embodiment of the invention lies in the provision of a ring-like conductive seal which is placed over the neck of a container and received within an annular slot in a closure cap when secured on the container, the seal being of a character enabling forming thereof against three-dimensional surfaces on the cap and container while disposed internally of the closure cap and without physically contacting the ring, the closure cap having at least one transparent portion enabling visual observation of the seal whereby displacement or deforming of the seal through tampering is readily observable.

A feature of another embodiment of the invention lies in the provision of a conductive seal fixed within a disposable closure cap adapted to be releasibly attached to a container in overlying relation to a reusable cap, the reusable cap having a three-dimensional surface thereon enabling forming of the seal thereagainst in a manner such that removal of the disposable cap causes irreparable damage to the seal visible through the disposable cap.

Further objects and advantages of the invention, together with the organization and manner of operation thereof, will become apparent from the following detailed description of the invention when taken in conjunction with the accompanying drawings wherein like reference numerals designate like elements through the several views.

DETAILED DESCRIPTION OF THE DRAWINGS

FIG. 6 is a fragmentary perspective view of an alternative ring-like seal which may be employed with the container and closure cap arrangement of FIG. 1;

FIG. 7 is a fragmentary vertical sectional view illustrating a seal member applied to seal receiving surfaces on the closure cap and container in accordance with another embodiment of the invention;

FIG. 8 is a fragmentary longitudinal sectional view of a container having a tamper proof closure cap arrangement in accordance with an alternative embodiment of the present invention; and FIG. 9 transverse sectional view taken substantially along line 9—9 of FIG. 8, looking in the direction of the arrows.

DESCRIPTION OF PREFERRED EMBODIMENTS

Figure 1:
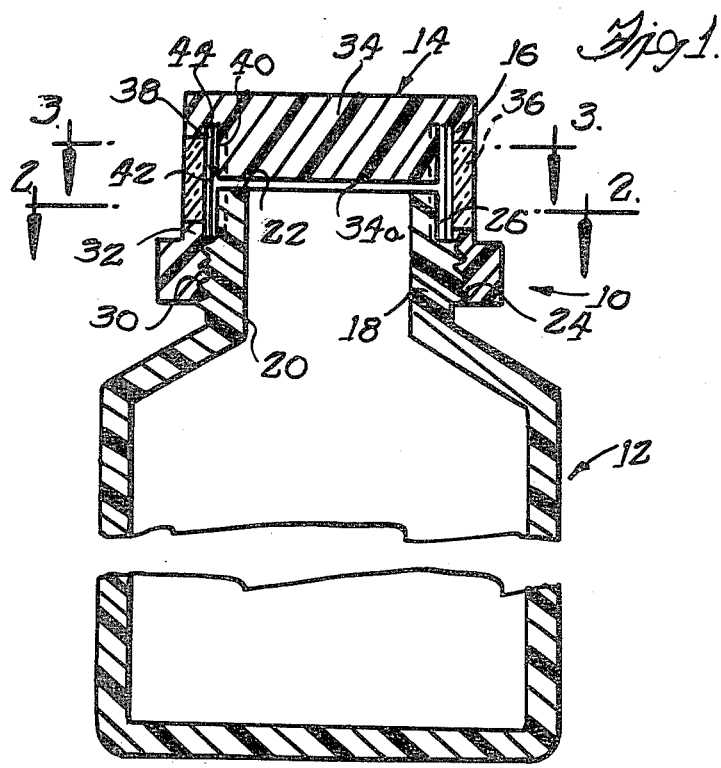
FIG. 1 is a foreshortened longitudinal sectional view of a container having a closure and tamper-proof seal applied thereon in accordance with one embodiment of the present invention.

Referring now to the drawings, and in particular to FIG. 1, a container having a tamper-proof closure arrangement thereon in accordance with one embodiment of the present invention is indicated generally at 10. Very generally the container and closure arrangement 10 includes a container, indicated generally at 12, on which is releasibly mounted a closure cap 14, and which cooperates with the closure cap to enable forming of a ring-like seal 16 against selected seal receiving surfaces on the closure cap and container while the closure cap is applied to the container and without physically contacting the seal. As will be described, the seal 16 is inaccessible and is applied such that any movement of or tampering with the closure cap causes irreparable damage to the seal 16 which is visually observable through the closure cap.

The container 12 may be of substantially any desired configuration and may be made of any suitable material such as glass, plastic, ceramic, selected metals or other organic or inorganic compounds. If made of glass or plastic, the container may be transparent or opaque. The container includes an upper annular wall or neck portion 18 which defines a generally cylindrical access opening 20 communicating with the interior of the otherwise closed container and which intersects an upper end surface 22 of the annular wall or neck 18. In the illustrated embodiment, the annular neck wall 18 has an external right-hand thread 24 formed thereon which is spaced longitudinally below the upper end 22 so as to enable the formation of a three-dimensional seal receiving surface 26 on the neck 18 which extends about the full outer periphery of the neck. The external thread 24 is adapted for releasible threaded connection with the closure cap 14 which, for this purpose, has an internal thread 30 formed internally of an annular wall or skirt 32 formed integral with or otherwise suitably secured to a circular cap end 34. The internal thread 30 is spaced longitudinally from the circular cap end 34 and is of a thread size to enable releasible connection to the external thread 24 on the container neck 18. The manner of releasibly mounting or attaching the closure cap 14 to the container neck may take alternative forms, such as bayonet-type connections and the like.

The closure cap 14 is preferably made of a transparent material such as a transparent plastic which enables visual observation through the closure cap from substantially any external angle. Alternatively, the closure cap may be made of an opaque material such as an opaque plastic or other suitable material which enables the provision of an annular transparent wall portion 36 formed intermediate the length of the annular wall or skirt 32. If desired, only an arcuate segmental portion of the annular wall 34 need be made transparent.

The closure cap end wall 34 is of sufficient longitudinal thickness to enable forming of an annular slot or groove 38 therein which is concentric with the longitudinal axis of the closure cap and is defined between concentric boundary surfaces 40 and 42. As illustrated in FIG. 1, the annular surface 42 is formed internally of the annular skirt wall 34 and extends from an annular slot base surface 44 longitudinally beyond an internal cap end surface 34a so that with the closure cap 14 mounted on the container neck 18, the annular slot 38 is established in part within the end cap 32 and in part between a portion of the peripheral surface 42 and the outer peripheral surface 26 on the container neck 18.

Figure 2:
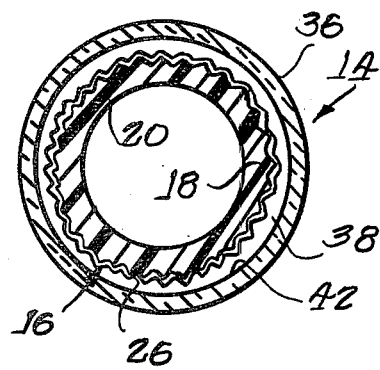
FIG. 2 is a transverse sectional view taken substantially along line 2—2 of FIG. 1, looking in the direction of the arrows.
Figure 3:
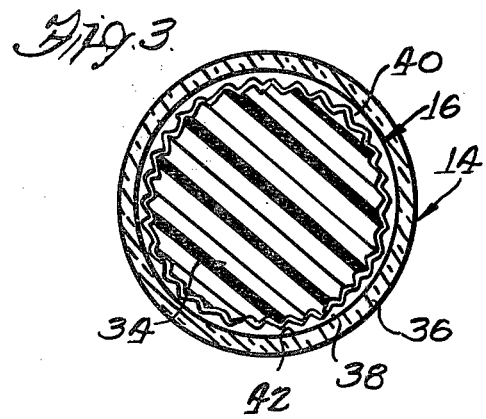
FIG. 3 is a transverse sectional view taken substantially along line 3—3 of FIG. 1, looking in the direction of the arrows.

In accordance with the embodiment of the invention illustrated in FIGS. 1-3, the peripheral surface 26 on the container neck 18 and the peripheral surface 40 on the closure cap are formed as generally annular seal receiving three-dimensional surfaces having substantially equal mean diameters. The three-dimensional surface 40 is formed so as to be substantially contiguous with surface 26 when the closure cap is mounted on the container. Referring to FIGS. 2 and 3, the three-dimensional surfaces 26 and 40 may take the form of annular spur gear type teeth or serrations. The three-dimensional seal receiving surfaces 26 and 40 may also take other alternative configurations such as illustrated, for example, in FIGS. 4 and 5 wherein right cylindrical surfaces 26' and 40' represent surfaces on the container and closure cap corresponding to surfaces 26 and 40 in FIGS. 1-3. The right cylindrical surfaces 26' and 40' each have three-dimensional letters or portions of letters formed or embossed thereon such that the letters form a word which may designate the contents of the corresponding container and which can be observed through the transparent closure cap, such as the word "DRUGS" shown in FIGS. 4 and 5. The surface 26', 40' could also be embossed with a three-dimensional logo or the like. As will be described, the peripheral surfaces 26 and 40 on the container neck 18 and closure cap 14, respectively, may comprise right cylindrical seal receiving surfaces such as indicated at 26' and 40' in FIG. 4 without three-dimensional embossments thereon.

The slot 38 is of sufficient size to receive the conductive ring-like seal 16 therein when the closure cap is mounted on the container neck 10 as illustrated in FIG. 1. In the embodiment of FIG. 1-3, the ring-like seal 16 is formed as a relatively thin tubular electrically conductive metallic ring having a longitudinal length such that when the closure cap 14 is mounted on an annular shoulder 18a of the container neck, the seal lies in juxtaposed relation to the peripheral surfaces 26 and 40. The seal 16 may, for example, be made of thin ductile aluminum and is characterized by its ability to be formed into intimate relatively tight contacting relation against the surfaces 26 and 40 from externally of the closure cap and container without physically engaging the seal. One technique for forming the seal 16 against the three-dimensional surfaces 26 and 40 is by magnetic forming in accordance with known principles and commercially available apparatus. Examples of magnetic forming apparatus and techniques which may be employed to form the seal 16 against the three-dimensional surfaces on the container neck and closure cap may be found in U.S. Pat. Nos. 2,976,907, 3,251,974, 3,383,890 and 3,423,978. Such techniques enable forming the seal 16 against surfaces 26 and 40 while the magnetic forming apparatus is spaced from the closure cap 14 and facilitates such forming through insulated surfaces. Briefly, such magnetic forming is accomplished by creating a rapidly changing high energy magnetic field as by passing a high amperage current pulse through one or more selectively shaped conductors which are positoned to induce a current through seal 16. The energy transferred to seal 16 by the interaction of the induced current with the magnetic field is made sufficient to create a force causing the annular seal to be formed radially inward against the underlying surfaces 26 and 40.

If a metallic container 12 is employed, the container should be made of a metal having a wall thickness or conductivity sufficient to provide different conductivity characteristics than the seal 16 so as not to be adversely affected by the magnetic forming process employed to form the seal against the peripheral surfaces 26" and 40. For example, if the seal 16 is formed of thin ductile aluminum or copper, the container 12 might be made of stainless steel or other metal.

In assembling the container 12, closure cap 14 and ring-like seal 16 as illustrated in FIG. 1, the seal 16 is first positioned on the upper end of the container neck 18 concentric with the peripheral neck surface 26. The closure cap 14 is then placed over the seal 16 and threaded onto the external thread 24 on the container neck or otherwise suitably mounted thereon where alternative releasible connecting means are employed such as a bayonet-type connection or other closure cap connecting technique.

Figure 4:
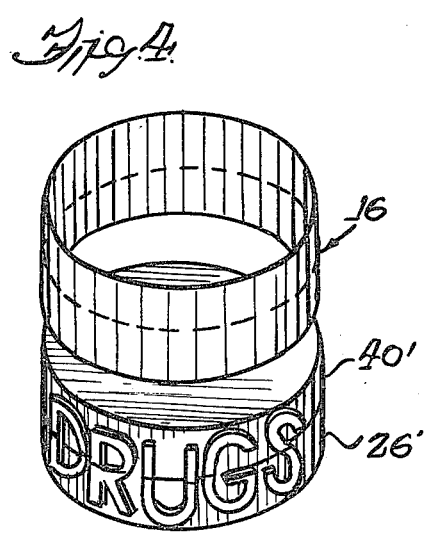
FIGS. 4 and 5 are perspective views illustrating the manner in which a conductive ring-type seal is placed onto three-dimensional surfaces of the container and closure cap in accordance with the invention, and the manner in which the seal is irreparably damaged upon relative movement between the closure cap and container.
Figure 5:
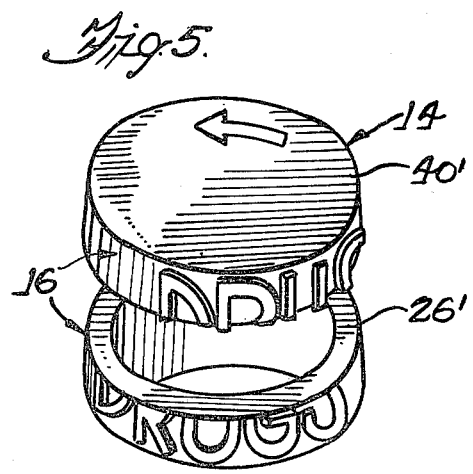

After assembling the closure cap 14 and seal 16 onto the upper neck portion of the container, the seal 16 is formed into intimate contacting relation with the peripheral surfaces 26 and 40 by subjecting the assembled container and closure cap to a suitable magnetic field operative to form the seal 16 inwardly against surfaces 26 and 40, or 26' and 40' in the embodiment of FIGS. 4 and 5. By forming the closure cap 14 as a fully transparent member or by providing an annular portion of the skirt 32 as a transparent wall, the seal 16 may be readily visually observed through the closure cap.

With the closure cap and seal thus assembled onto the container, any attempt to tamper with or remove the closure cap, either through rotation or longitudinal movement relative to the container, will effect irreversible or irreparable damage or deformation to the seal 16 which is visible through the closure cap, thus providing an indication to a prospective purchaser that the container has been tampered with.

As aforementioned, FIGS. 4 and 5 illustrate application of the seal 16 to external surfaces 26' and 40' on the container and closure cap and which may comprise right cylindrical surfaces with or without three-dimensional surfaces embossed thereon, such as in the illustrated embossed letters which comprise a selected word or logo. FIG. 4 illustrates placement of the seal 16 over the surfaces 26' and 40' so as to lie in juxtaposed relation thereto. FIG. 5 illustrates the effect of relative rotation between the closure cap surface 40' and the container surface 26' after forming the seal 16 intimately against the peripheral surfaces 26 and 40, such rotational movement serving to irreversibly shear the seal 16 which would be visible through the closure cap. A shear line or score line, such as indicated at 16a in FIG. 4, may be formed circumferentially of seal 16 preferably at its longitudinal midpoint to facilitate shearing of the seal upon attempted removal of the closure cap. Such a shear line may be particularly desirable when applying a metallic seal member 16 tightly against underlying cylindrical surfaces.

FIG. 6 illustrates an alternative ring-like seal, indicated generally at 50, which may be employed in the closure arrangement of FIG. 1 as an alternative to the ring-like seal 16. The ring-like seal 50 is comprised of a pair of similar electrically conductive ring members 52a and 52b which are interconnected by an annular or tubular frangible sleeve or spacer 54 made of metal, non-metal or other suitable material and which acts to maintain the conductive ring members 52a,b in generally parallel coaxial spaced relation. The tubular sleeve 54 is of sufficient longitudinal length to enable the ring-like seal 50 to be assembled over the peripheral surface 26 on the container neck 18 and received within the slot 38 in the closure cap 14 when mounted on the container. In this position the conductive rings 52a,b lie in juxtaposed generally coaxial relation to the peripheral surfaces 26 and 40 on the container neck and closure cap. The conductive ring members 52a and 52b are characterized as being deformable by magnetic forming from externally of the closure cap and associated container neck so as to form the ring members 52a,b into intimate relatively tight contacting relation with the peripheral surfaces 26 and 40. In this manner, the frangible sleeve or spacer 54 bridges the container neck and closure cap so as to be irreversibly fractured or deformed upon relative movement between the closure cap and container.

FIG. 7 illustrates another alternative embodiment of a ring-like seal member, indicated generally at 56, which may be employed in the closure cap arrangement of FIG. 1 as an alternative to the ring-like seal member 16. The ring-like seal 56 includes a tubular seal sleeve 57 which is preferably made of a relatively thin frangible material such as a paper type material and which extends about the seal receiving surfaces 26 and 40 on the container 12 and closure cap 14, respectively, in juxtaposed relation therewith. A pair of separate electrically conductive ring members 58a and 58b are positioned to overlie opposite end portions of the seal 57 and are formed, as by the aformentioned magnetic forming process, against the seal receiving surfaces 26 and 40 so as to firmly secure the opposite ends of seal 57 to the container neck and closure cap. The seal member 57 is selected such that movement of the closure cap relative to the associated container will shear the seal member internally of the closure cap skirt 32 which is preferably transparent to enable visual observation of the seal and thus visual detection of tampering. The seal receiving surfaces 26 and 40 may be right cylindrical surfaces, three-dimensional surfaces or two-dimensional non-circular surfaces. The seal member 57 may be provided with a circumferential shear or score line if desired.

FIGS. 8 and 9 illustrate an alternative embodiment of a visible tamper-proof closure arrangement, indicated generally at 60, in accordance with the invention. As illustrated in FIG. 8, a container 62 has a neck portion 64 which defines a generally cylindrical access opening 66 and has longitudinally spaced right-hand external threads 68 and 70 formed on its outer peripheral surface. The upper external thread 70 has a smaller diameter than the lower thread 68 and is adapted to threadedly receive a reusable closure cap 74 having an annular skirt 76 in which a thread 78 is formed for releasable threaded engagement with the container thread 70. The reusable closure cap 74 has a three-dimensional design or pattern formed on its upper outer surface 80 which may take substantially any configuration other than a concentric ring pattern. Examples of suitable three dimensional patterns are lettering, logo symbols or other geometric or random patterns, such as indicated at 82 in FIG. 9, which may be formed or embossed on surface 80.

The larger diameter lower external thread 68 is adapted for threaded engagement with a secondary throwaway or disposable cap 84 having an annular skirt 86 in which an internal thread 88 is formed for threaded engagement with the external thread 68. The disposable cap 84 is of sufficient size to enable it to be received over the reusable closure cap 74, as illustrated in FIG. 8, and carries a generally circular electrically conductive membrane or foil type seal member 100. The seal 100 has its outer peripheral margin 100a fixed internally of the disposable cap 84 such as by adhesive retention within an annular groove or slot 102 formed internally of skirt 86 proximate an upper end wall 104 of the disposable cap. The circular seal 100 is positioned so as to lie in juxtaposed relation to the three-dimensional upper surface 80 on the reusable closure cap 74 when the outer disposable cap is mounted on the container neck 94. After mounting both of the caps 74 and 84 on the container 62, the circular seal member 100 is formed against the three-dimensional surface 80 so as to lie in intimate contacting relation therewith by magnetic forming or a similar technique operative to form the seal against the three-dimensional surface from externally of the container and without removing the disposable cap. Preferably, the disposable cap 84 is made fully transparent to enable visual observation of seal 100. Alternatively, a central portion of the end wall 104, such as 104a, may be made transparent to enable visual observation of the seal with the disposable cap installed.

After forming the seal 100 against the three-dimensional surface 80 on the reusable closure cap 74, any attempt to remove the disposable cap 84 so as to provide access to the reusable closure cap 74 will result in movement of the seal 100 and cause irreversible damage or deformation of the seal as it is torn or pulled out of the three-dimensional surface 80.

Thus, in accordance with the present invention, a container and tamper-proof closure cap arrangement is provided wherein a visually observable seal is protected internally of the closure cap and is operative to indicate tampering with the container as by attempted removal of the associated closure cap. The seal and closure cap are operatively related to the container such that any attempt at removing the closure cap, as in the embodiments of FIGS. 1-7, or removing the disposable cap, as in the embodiment of FIGS. 8 and 9, results in irreversible damage to the seal which may be visually observed through the associated closure cap, thus indicating to the prospective purchaser that the container has been tampered with. This advantageous result occurs even though various types of mechanical closures may be employed.

It will be appreciated that the described tubular conductive seal 16 need not be made circular nor form a full annular seal but may take the form of one or more arcuate segments of the illustrated annular seal. It will also be understood that additional sealing means may be provided across the access opening in the illustrated containers, such as a vacuum sealing membrane or a cork or other stopper inserted inside the container neck while still enabling employment of tamper-proof seals as aforedescribed. Further, while the containers of the illustrated embodiments have been described as having annular neck portions with generally circular access openings, the neck portions and access openings could take other shapes and sizes compatable with the selected closures.

By providing a tamper-proof seal which requires relatively sophisticated equipment not available to the general public, removal of the closure cap and associated seal and reapplication of a new seal after tampering with the container is most difficult and highly improbable.

While preferred embodiments of the present invention have been illustrated and described, it will be understood that changes and modifications may be made therein without departing from the invention in its broader aspects. Various features of the invention are defined in the following claims.

What is claimed is:

1. A container and closure cap arrangement comprising;
    a container having a neck portion defining an access opening,
    a closure cap having a cap end portion and a skirt portion, said closure cap and container neck portion being mutually cooperable to enable releasable mounting of said closure cap on said neck portion, said container neck portion and said closure cap having seal receiving surfaces selectively formed thereon,
    and a seal member interposed between said closure cap and said container so as to be inaccessible from externally of said closure cap, said seal member being mutually cooperable with said seal receiving surfaces on said container and closure cap when mounted on said container such that relative movement between said container and closure cap causes irreversible deformation of said seal member,
    said closure cap having at least one transparent portion enabling visual observation of said seal so that deformation of said seal may be observed through said closure cap to provide an indication of tampering with said container.

2. A container and closure cap arrangement as defined in claim 1 wherein said container neck portion is defined by an annular wall, said seal receiving surfaces being formed on said closure cap and said annular wall so as to be disposed in substantially contiguous relation when said closure cap is mounted on said container neck portion, said seal member comprising a ring-like seal formed against said seal receiving surfaces in contacting relation therewith so as to be deformed upon relative movement between said container and closure cap.

3. A container and closure cap arrangement as defined in claim 2 wherein said closure cap has an annular slot formed therein adapted to receive said ring-like seal member therein when said closure cap is mounted on said container neck portion, said seal receiving surface on said closure cap defining a boundary surface of said slot and being adapted to have said seal member formed thereagainst when disposed within said slot.

4. A container and closure cap arangement as defined in claim 1 wherein said seal member is made of an electrically conductive material adapted to be formed against said seal receiving surfaces when selectively subjected to a high energy magnetic field.

5. A container and closure cap arrangement as defined in claim 1 wherein said closure cap is made of transparent material enabling full observation of said seal when said closure cap is mounted on said container.

6. A container and closure cap arrangement as defined in claim 1 wherein said seal receiving surfaces comprise three-dimensional surfaces defined by serrated surfaces formed on said closure cap and on said container neck portion, said three-dimensional surfaces beng adapted to have said seal member formed in intimate contacting relation therewith such that rotation of said closure cap relative to said container effects an irreversible deformation of said seal member observable through said closure cap.

7. A container and closure cap arrangement as defined in claim 1 wherein said seal member includes a pair of annular electrically conductive elements adapted for placement in juxtaposed relation to said seal receiving surfaces on said container neck and closure cap and being adapted to be formed against said seal receiving surfaces when selectively subjected to a high energy magnetic field.

8. A container and closure cap arrangement as defined in claim 1 wherein said seal receiving surfaces comprise three-dimensional surfaces, said sealing member being adapted to be formed against three-dimensional surfaces when selectively subjected to a high energy magnetic field, said closure cap and container being made of materials which are unaffected by said magnetic field.

9. A container and closure cap arrangement comprising;
    a container having a neck portion defining an access opening,
    a first closure cap having a cap end portion and a skirt portion, said closure cap and container neck portion being mutually cooperable to enable releasable mounting of said first closure cap on said neck portion, said first closure cap having a three-dimensional surface selectively formed thereon,
    a second closure cap adapted for mounting on said container in a manner to overlie said first closure cap,
    and a seal member interposed between said first and second closure caps so as to be inaccessible from externally of said second closure cap, said seal member being cooperable with said three-dimensional surface on said first closure cap when said closure caps are mounted on said container such that relative movement between said first and second closure caps causes irreversible deformation of said seal member,
    said second closure cap having at least one transparent portion enabling visual observation of said seal so that deformation of said seal may be observed through said second closure cap to provide an indication of tampering with said container.

10. A container and closure cap arrangement as defined in claim 9 wherein said container neck portion and said second closure cap are mutually cooperable to enable releasable mounting of said second closure cap on said container neck portion in generally coaxial overlying relation to said first closure cap, said first closure cap having an upper surface defining said three-dimensional surface, said seal member being carried by and within said second closure cap so as to lie in juxtaposed relation to said three-dimensional surface on said first closure cap and being formed in intimate contacting relation therewith such that relative movement between said first and second closure caps causes irreversible deformation of said seal member visually observable through said second closure cap.

11. A container and closure cap arrangement as defined in claim 9 wherein said seal member is made of an electrically conductive material adapted to be formed against said three-dimensional surface when selectively subjected to a high energy magnetic field.

12. A container and closure cap arrangement as defined in claim 9 wherein said second closure cap is made of transparent material enabling full observation of said seal when said second closure cap is mounted on said container.

13. A container and closure cap arrangement as defined in claim 10 wherein said sealing member is adapted to be formed against said three-dimensional surface when subjected to selective magnetic energy, said closure caps and container being made of materials which are unaffected by said magnetic field.

14. A method for making a container and associated closure cap so as to provide a visual indication of tampering, said container including a neck portion defining an access opening and adapted for cooperation with the closure cap so as to enable releasable mounting of the closure cap on said neck portion, said method comprising the steps of:
   (a) forming seal receiving surfaces on the neck portion of the container and on the closure cap internally thereof so as to be inaccessible when the closure cap is mounted on the neck portion of the container,
   (b) mounting the closure cap on the neck portion of the container with an electrically conductive seal member interposed between said neck portion and said closure cap in juxtaposed relation with said seal receiving surfaces, said closure cap being adapted to enable visual observation of the seal through said closure cap,
   (c) and forming said seal against said seal receiving surfaces in surface contacting relation therewith while said closure cap is mounted on said container such that relative movement between the container and closure cap deforms said seal in a manner providing a visually observable indication of tampering without removal of said closure cap.

15. The method as defined in claim 14 wherein said seal member is made of a material adapted to be formed by a selective high energy magnetic field, said step of forming said seal member against said seal receiving surfaces comprising subjecting said seal member to a high energy magnetic field in a manner to form said seal member against said seal receiving surfaces in intimate contacting relation therewith.

16. The method as defined in claim 15 wherein said seal member comprises a ring-like electrically conductive member.

17. The method as defined in claim 14 wherein said closure cap is fully transparent.

18. The method as defined in claim 16 including the step of forming an internal slot within the closure cap configured to receive said sealing member therein when said closure cap is mounted on said neck portion of said container, said seal receiving surface on said closure cap establishing one boundary of said slot in juxtaposed relation to said seal member.

19. A method as defined in claim 14 wherein said step of forming said seal receiving surfaces comprises forming a three-dimensional surface on said neck portion of said container and on said closure cap internally thereof.

20. A method as defined in claim 19 wherein said step of forming said three-dimensional surfaces comprises forming serrated surfaces on said closure cap and said container neck portion so as to establish generally annular serrated surfaces, said sealing member being formed against said serrated surfaces.

21. The method as defined in claim 19 wherein said three-dimensional surfaces comprise embossed letters or the like formed on said closure member and neck portion of said container.

22. A container and closure cap arrangement as defined in claim 1 wherein said seal member includes a generally tubular frangible seal member, and a pair of electrically conductive ring members adapted to be formed against said seal receiving surfaces so as to secure opposite ends of said tubular seal member to said container and closure cap, whereby relative movement between said container and closure cap effects irreversible deforming of said seal member visible through said closure cap.

* * * * *